SALADEE & MOORE.
Animal Stock.
No. 60,262.
Patented Dec. 4, 1866.
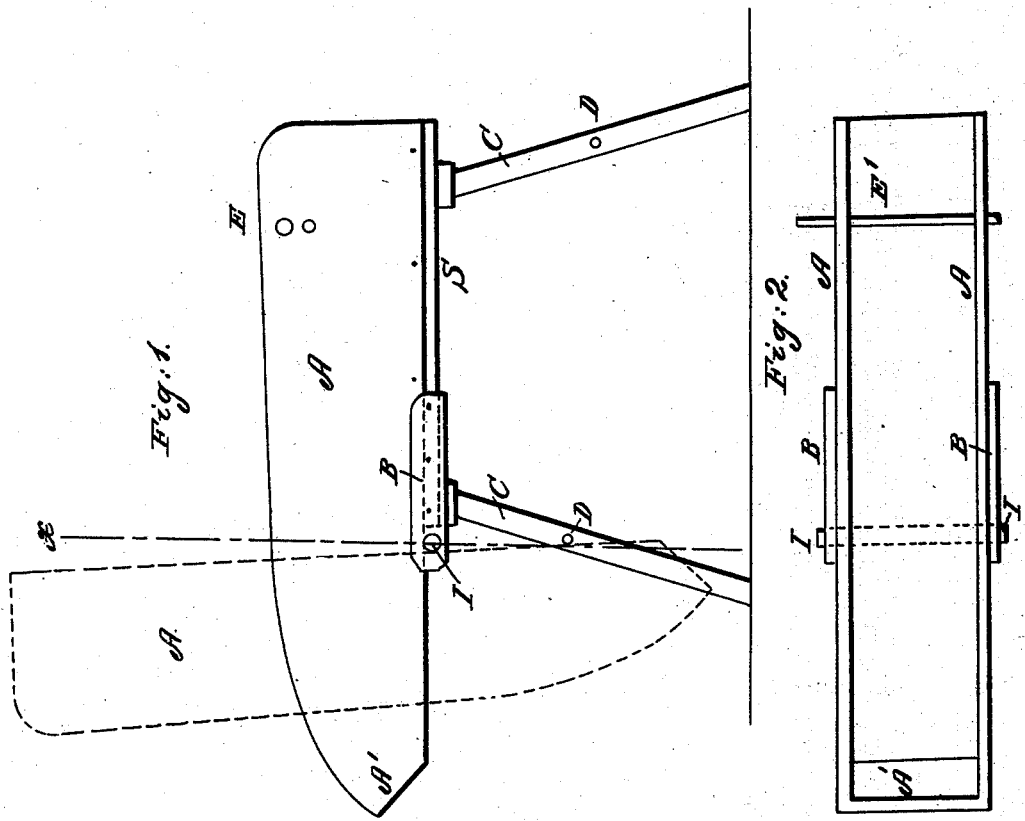
Witnesses:
Charles W. Saladee.
William Armstrong.
Inventors:
Cyrus W. Saladee.
Jesse R. Moore.

United States Patent Office.

IMPROVEMENT IN SHEEP CHAIR.

CYRUS W. SALADEE AND JESSE R. MOORE, OF NEWARK, OHIO.

Letters Patent No. 60,262, dated December 4, 1866.

SPECIFICATION.

TO ALL WHOM IT MAY CONCERN:

Be it known that we, CYRUS W. SALADEE and JESSE R. MOORE, of Newark, county of Licking, State of Ohio, have invented a new and improved mode of constructing Sheep Chairs for tagging sheep; and we do hereby declare that the following is a full and exact description thereof, reference being had to the accompanying drawings, and to the letters of reference marked thereon.

The nature of our invention consists, first, in the manner hereafter shown and described of securing and operating the box holding the sheep, on the end of a common bench, in such manner that the box may be raised up into a perpendicular position upon a hinge or joint interposed between the box and the end of the bench supporting the same so as to receive the sheep without the labor of raising him up by main strength; and, secondly, in the arrangement of the pin passing through the rear end of the box to hold down the head of the sheep while he is being operated upon.

The box A of our "chair" we make of one-inch lumber, nailed or screwed together substantially in the manner clearly shown by the drawings, figs. 1 and 2. The front end of the box A is closed by the narrow end piece A 1, as shown. The bottom of the box as here shown is straight, but we make some of them with the bottom of the box dropped down in a circular line, so as to conform to the shape of the sheep's back, although the straight bottom answers a very good purpose. Across the bottom of the box we secure the wood or iron journal I, the ends of which are received and held in the slats B B, nailed to the sides of the chair or bench S. (See figs. 1 and 2.) Upon this joint the box A is operated, and can be raised up in the position shown by the red lines, fig. 1. Through the sides of the box A, at or near the head, we bore the holes E, as shown in fig. 1, and through which we pass the pin E 1, fig. 2. The "chair," supporting our box A, is a simply constructed bench, with legs, c c, as shown in fig. 1, and braced laterally by the rounds D D 1. The operation of our complete "sheep chair" is substantially as follows, viz: the "chair" being placed in position when the "tagging" is to be performed, the box is thrown up in the position shown by the red lines in fig. 1, when the operator catches a sheep and rears him up on his hind feet immediately in front of the box, (with his back toward the box,) when, by the right hand of the operator, he is pressed back into the box, while at the same instant the box is turned up with the left hand in a horizontal position, and left to rest upon the bench S. The sheep is thus held on his back by the sides of the box, and his head is kept down by the pin E 1, fig. 2, passing through under his neck. After the sheep is operated upon the pin is withdrawn, the box raised up, when he is thrown out upon his feet without being touched by the operator. The handling of a flock of sheep for the purpose of "tagging," &c., requires, under any of the present methods of doing the same, two persons, one to hold the sheep, and the other to work on him, and the operation is attended with considerable labor.

We are aware that several devices for holding sheep for the purpose herein named are well known and in use, and for the purpose of specifying clearly the peculiar advantage of our "sheep chair" over any other devices of a similar character, we will briefly state the manifest faults and objections we have found in the use of the sheep "holders" or "chairs" now in use.

The operation of "tagging" sheep now most generally practised is without any device for holding the animal, requiring two persons, one to hold him as best he may, and the other to work on him. But recently a common bench about four feet long and ten inches wide, with sides about twelve inches high, the one side nailed to the side of the bench, and the other made adjustable, but for no practical purpose, has been made use of. But even in this case it requires two persons to do the work, the one to tip up the bench, while the other places the sheep into the box, and if but one person is to do the work he must raise the sheep up into the box by main strength. Another device used for this purpose is a box similar to the box A shown in the drawings, pivoted to a perpendicular arm whose lower extremity rests and works upon a hinge, the standard being firmly secured to the bottom of the box or frame supporting the box, and working in combination with sundry braces to hold the box in position. But in this case (the box not being balanced upon a joint immediately under the bottom,) when the box is lifted up and thrown forward in the position to receive the sheep, it is so far past the centre upon which the lower end of the standard supporting it is hinged, that to lift it up and back again in its horizontal position with the sheep in it requires nearly, if not altogether, as much exertion as to raise the animal up into the box by main force. Again, this device is too complicated. But balance the box A, or nearly so, on the end of the bench upon a hinge or joint, as shown in the drawing, and the extraordinary ease with which we can operate the box with the sheep in it is apparent, for, in this case, the box is virtually a lever, with the hinge I, between the bottom of the box and the front end of the stationary bench, serving as the fulcrum on which to swing it. Another advantage we attain in this combination of bench S and box A is, that when done using the box for the purpose of "tagging," it can be removed or detached from the bench, when the latter will serve to hold the "rack" on which we shear the sheep.

We therefore disclaim the use or manufacture of a "sheep chair" having one side of the box nailed, or otherwise firmly secured, to the side of the bench, and the other side adjustable, or of pivoting the box to an arm in combination with standards to hold the box in position, as these devices are no part of our invention; but what we do claim as new of our invention, and desire to secure by Letters Patent, is—

The combination of box A and bench S, as described, and pin E in combination with box A, constructed and operating as specified, and the purposes set forth.

CYRUS W. SALADEE,
JESSE R. MOORE.

Witnesses:
    E. A. SALADEE,
    WILLIAM ARMSTRONG.